United States Patent [19]

Szczechura et al.

[11] Patent Number: 5,084,514

[45] Date of Patent: Jan. 28, 1992

[54] LATEX GLOVES WITH IMPROVED DONNABILITY

[75] Inventors: Bernard J. Szczechura, Smyrna; Rebecca L. Durney Cronin, Townsend, both of Del.

[73] Assignee: Reichhold Chemicals, Inc., Durham, N.C.

[21] Appl. No.: 613,313

[22] Filed: Nov. 14, 1990

[51] Int. Cl.$^5$ .................. C08L 75/00; C08L 47/00
[52] U.S. Cl. .................................. 525/123; 525/192; 525/221; 525/329.3; 526/329.1; 524/559; 524/560
[58] Field of Search .............. 526/329.1; 525/329.3, 525/123, 192, 221; 524/559, 560

[56] References Cited

U.S. PATENT DOCUMENTS

| | | | |
|---|---|---|---|
| 2,753,318 | 6/1956 | Maeder | 524/850 X |
| 3,356,659 | 12/1967 | Hagemeyer | 526/329.1 |
| 3,411,982 | 11/1968 | Kavalir | 428/494 X |
| 3,919,442 | 11/1975 | Esemplare | 428/494 |
| 4,575,476 | 3/1986 | Podell | 428/494 |

Primary Examiner—Joseph L. Schofer
Assistant Examiner—M. Nagumo
Attorney, Agent, or Firm—Rodman & Rodman

[57] ABSTRACT

A polymer latex for making gloves having excellent donning and doffing characteristics comprises a carboxylated open chain aliphatic diene/acrylonitrile/(meth-)acrylate terpolymer. A process for making latex gloves using the polymer latex prepared in accordance with the invention is also disclosed.

15 Claims, No Drawings

LATEX GLOVES WITH IMPROVED DONNABILITY

BACKGROUND OF THE INVENTION

1. Field of the Invention doffing and donning characteristics.

2. Description of the Prior Art

Latex gloves are generally manufactured by using molds shaped like hands. The molds are dipped with the fingers pointing downward into a latex polymer. The dipped mold is withdrawn from the polymer after a predetermined time has elapsed, and a portion of the latex polymer forms a coating on the mold. The latex polymer coating on the mold is cured and then removed from the mold on an inside-out basis so that the outer latex surface becomes the inside of the glove.

Removing the cured latex glove from the mold is referred to as "doffing". Doffing is often a difficult procedure because the cured latex glove tends to be tacky and adhere to the mold.

Another problem that must be dealt with after the gloves have been removed from the mold, is that they are often difficult to put on a human hand because of the same tacky quality of the latex. Putting the glove on one's hand is referred to as "donnability" or "donning" the glove. Numerous proposals have also been made for improving the doffing and donning characteristics of latex gloves.

U.S. Pat. No. 2,310,889 to Becker discloses vinyl resin compositions that are used to make gloves. The vinyl resins are made by conjointly polymerizing two or more vinyl derivatives such as vinyl halides, especially vinyl chloride, with vinyl esters of aliphatic acids such as vinyl acetate, propionate and butyrate. An acrylate resin such as methyl methacrylate is used to give increased strength and coherence to the composition.

U.S Pat. No. 3,411,982 to Kavalir et al, which is a division of U.S. Pat. No. 3,286,011 to Kavalir et al, relates to a method of making elastomeric articles by using a dipping form with a slippery surface to facilitate donning and doffing. The slippery surface is prepared from an elastomer latex mixed with a latex or aqueous dispersion of a resin. The mixed latex composition contains rubber solids and resin solids. The rubber comprises copolymers of butadiene with acrylonitrile, methyl methacrylate and the like. The resins include acrylic ester polymer resins such as methyl acrylate and methacrylate, ethyl acrylate or methacrylate, butyl acrylate and the like or copolymers of these acrylates with each other or with other monomers such as styrene, acrylonitrile, acrylic acid, methacrylic acid and mixtures of these resins.

U.S. Pat. No. 4,575,476 to Podell et al, discloses a dipped rubber article having a skin contacting surface layer formed of a hydrogel polymer, such as polyvinyl pyrrolidone, polyhydroxyethyl acrylate or methacrylate, polyhydroxypropyl acrylate or methacrylate, and copolymers of these with each other or with acrylic or methacrylic acid, acrylic or methacrylic esters or vinyl pyridine. The preferred hydrogel polymer is a copolymer of a 2-hydroxyethyl methacrylate with methacrylic acid or with 2-ethylhexyl acrylate or a ternary copolymer of 2-hydroxyethyl methacrylate, methacrylic acid and 2-ethylhexyl acrylate.

U.S. Pat. No. 4,482,577 to Goldstein et al, discloses a process of coating a flexible vulcanized surgeon's glove by forming a lamination of a hydrophilic polymer so that the external lamination of the coating of the polymer eliminates the need for lubricating powder on the glove. The copolymer is produced from a mixture of 2-hydroxyethyl methacrylate and 2-ethylhexyl acrylate.

U.S. Pat. No. 3,919,442 to Esemplare et al, discloses a slip coating that is rubber free, extensible and adheres to the rubber surface of a glove. The coating comprises about 5 to 95% by weight of a first resin such as a vinyl chloride/alkyl acrylate copolymer, a vinylidene chloride/alkyl acrylate copolymer or a vinyl acetate/alkyl acrylate copolymer, and about 10 to 95% by weight of a second resin such as a vinyl chloride-vinyl ester copolymer, or a vinylidene chloride-vinyl ester copolymer.

U.S. Pat. No. 3,856,561 to Esemplare et al, discloses chloride/alkyl acrylate copolymer slip coatings for rubber surfaces such as gloves.

U.S. Pat. No. 4,082,862 to Esemplare et al, relates to slip coatings provided on the surface of rubber articles and defines the slip coating composition and resins in terms of the percent elongation.

U.S. Pat. No. 3,268,647 to Hayes et al, discloses a dipping form and method for manufacturing rubber gloves with strengthened cuff portions. Hayes discloses a glove mold or form that uses generally parallel flutes extending longitudinally from the wrist area to the base of the glove form to strengthen the cuff portion of the glove.

U.S. Pat. No. 3,852,826 to Shindler discloses surgical gloves provided with a colored circumferential band overlying the cuff portion to impart visual identification of the glove size and further strengthen the cuff. The rate of deposition of the latex is accelerated by dipping the form into a conventional coagulant such as a calcium nitrate solution, a hydrated magnesium acetate solution or the like prior to dipping the form into the latex. The thickness of the latex coating varies with the type and concentration of the coagulant and the immersion time.

U.S. Pat. No. 2,941,257 to Davis discloses a secondary coating of synthetic rubber on gloves formed of natural rubber.

U.S. Pat. No. 3,859,410 to Sidley discloses a method of producing gloves with a relatively thin wall thickness in the finger and palm portions and a relatively thick wall thickness in the cuff portion.

U.S. Pat. No. 4,304,008 to Joung discloses a powder-free surgeon's glove with a halogen resistant layer such as silicone covalently bonded to an outer surface. The inner surface is halogen treated for smooth, non-tacky donning characteristics.

U.S. Pat. No. 4,340,348 to Kurtz, which is a divisional patent of U.S. Pat. No. 4,390,492 to Kurtz, discloses a molding device for gloves with at least 300% elongation including a tank containing a polymer and a pair of glove molds.

U.S. Pat. No. 4,521,365 to Kurtz discloses an apparatus for preventing web formation during the dip molding of gloves by using small objects having a diameter of about one-eighth inch that float on the surface of the polymer and move along the surface of the polymer as the mold is withdrawn.

SUMMARY OF THE INVENTION

A latex comprising a carboxylated butadiene/acrylonitrile/(meth)acrylate terpolymer is useful for making latex gloves with improved doffing and donning characteristics. The improved latex glove can be stripped or removed from a mold without the use of powder to assist its release. The glove has an extremely "dry feel", which improves donnability.

DESCRIPTION OF THE PREFERRED EMBODIMENTS

In accordance with the present invention a carboxylated latex terpolymer of butadiene/acrylonitrile/(meth)acrylate is used to make latex gloves with improved doffing and donning characteristics. The term "(meth)acrylate" is used herein to designate an acrylate and/or methacrylate monomer.

The terpolymer is prepared by polymerizing all monomers, that is, the butadiene, acrylonitrile, (meth)acrylate, and carboxylic acid components together via standard emulsion polymerization techniques in the presence of surfactants, water and initiator.

The butadiene component is the preferred embodiment of an open chain aliphatic conjugated diene containing about 4 to 9 carbon atoms and can vary from about 40 to 80 weight %, preferably about 50 to 70 weight % and most preferably about 55 to 65 weight % of the total latex terpolymer composition. The butadiene is more precisely 1,3-butadiene.

The acrylonitrile component can vary from about 15 to 45 weight %, preferably about 20 to 40 weight %, and most preferably about 25 to 35 weight % of the total latex terpolymer composition.

The acrylate/methacrylate component is preferably an acrylate monomer, such as methyl acrylate, methyl methacrylate, butyl acrylate, ethyl acrylate, 2-ethyl hexyl acrylate and the like. This acrylate/methacrylate component can vary from about 2 to 12 weight %, preferably about 4 to 10 weight %, and most preferably about 5 to 7 weight % of the total terpolymer composition.

The acid component used to carboxylate the terpolymer is a carboxylic acid, such as acrylic acid, methacrylic acid, maleic acid, itaconic acid, fumaric acid and the like, or a half ester of a dicarboxylic acid such as itaconic acid, maleic acid, or fumaric acid. The acid component can vary from about 2 to 10 weight %, preferably from about 5 to 7 weight % of the total terpolymer composition.

Latex gloves are manufactured using the liquid carboxylated butadiene/acrylonitrile/(meth)acrylate latex terpolymer as a dipping medium for the glove form or mold, which resembles a hand. Other latexes, such as acrylics, butyl latex, ethylenevinyl acetate, carboxylated butadiene styrene, polyurethane, neoprene, natural rubber and the like can be blended with the carboxylated butadiene/acrylonitrile/(meth)acrylate latex terpolymer, in amounts up to about 25% by weight.

Separate glove forms or molds, are provided for the right and left hand. The molds are made in a variety of sizes and shapes corresponding to the various hand sizes for which the gloves are intended. The mold substrate is preferably porcelain, bisque or glazed, but other substrates such as stainless steel, glass, hard woods, and plastic can also be used.

The form or mold is dipped or immersed into a gelling agent or coagulant for the latex polymer, and then withdrawn. The coagulant is maintained at temperatures of about 65° F. to 150° F., preferably about 70° F. to 90° F. for alcohol based coagulants, and about 110° F. to 140° F. for water based coagulants.

Suitable coagulants include, but are not limited to, calcium nitrate, calcium chloride, acetic acid, magnesium acetate, and the like. A 25 to 50% solution of calcium nitrate in water or ethyl alcohol is preferred, and a 30 to 40% calcium nitrate concentration is particularly preferred.

After the mold is removed from the coagulant, any excess liquid is permitted to flash off or dry, leaving a residual coating of the coagulant on the mold.

The mold coated with coagulant is then dipped into the liquid carboxylated butadiene/acrylonitrile/(meth)acrylate latex terpolymer, at a temperature of about 65° F. to 100° F., and preferably about 70° F. to 90° F. The amount of time that the mold is immersed in the latex determines the wall thickness of the glove that is produced. The shorter the dwell time period, the thinner the wall thickness of the glove, and vice-versa.

The following table shows a typical variation in coating thickness of the latex as a function of dwell time:

TABLE 1

| Dwell Time (seconds) | Coating Thickness (mils) |
| --- | --- |
| 0 (in and out) | 5–6 |
| 30 | 9–10 |
| 60 | 11–13 |

The mold is removed from the latex with a coating of gelled latex adhering to the mold. The mold is then placed in a water bath to leach out the gelling agent at a temperature of about 80° F. to 140° F., and preferably about 85° F. to 115° F. for about 1 to 10 minutes.

The latex coated mold is then removed from the leach bath and placed into a drier. The drier temperature can vary from about 120° to 200° F. In one embodiment, the mold with the gelled latex can be placed into the dryer at 120° F. and the temperature gradually increased to 200° F.

The latex coated mold is generally maintained in the dryer for a period for about 40 to 120 minutes, and preferably about 60 to 75 minutes. A drying time of about sixty minutes is preferred when the dryer is maintained at a temperature of about 160° F. for the entire drying cycle.

The latex glove is then cured on the mold. Curing is carried out at a temperature of about 250° F. to 310° F., for about 15 to 30 minutes.

The latex glove is removed from the mold by turning it inside out so that the inner latex surface contacting the mold becomes the outside surface of the glove. The carboxylated butadiene/acrylonitrile/(meth)acrylate terpolymer provided in accordance with the present invention enables the glove to be removed easily from the mold without further treatment or additives. The stripping process does not require any powder to release the latex glove from the mold. The end product has an extremely "dry feel" surface, which greatly improves donnability.

The evaluation of the donning and doffing characteristics of the latex glove is essentially a qualitative exercise based on the ease of removing the glove from the mold, and placing it on one's hand.

Since the ease of donning and doffing the latex glove is directly related to its "reduced friction dry feel" or slipperiness, a numerical dryness coefficient has been established to rate this characteristic. The ratings scale varies from 1 to 10. The higher the coefficient, the greater the non-tacky feel of the glove and corresponding ease in donning and doffing the glove.

In practice, the dryness coefficient is obtained for latex gloves prepared from a particular formulation by having a group of individuals skilled in the art doff and don the gloves, and then rate them in accordance with the ratings scale. An average dryness coefficient of about 8 to 10 is indicative of a glove that has excellent donning and doffing properties.

Generally, dryness coefficients of less than 8 are indicative of gloves which require additives to improve slipperiness such as talc or starch powder, halogenation treatment (chlorination, bromination), or other slip coatings or detackifier treatments known in the art.

However, the present invention can achieve dryness coefficients of about 8 to 10 in a neat state, without such slipperiness additives.

Thus, gloves prepared from the carboxylated butadiene/acrylonitrile/(meth)acrylate terpolymer in accordance with the invention can be used without powder, halogenation or secondary coatings. The gloves have an extremely dry feel and excellent donning and doffing characteristics. This is especially important with gloves used for medical applications, for example, by physicians performing surgery.

Latex gloves that are presently available commercially generally fall into 3 categories, high powder, low powder and no powder. Gloves with powder in an operating or sterile environment can create a danger of contamination. The "no powder" gloves are usually halogenated or have special slip coatings or detackifiers, and are extremely expensive.

In contrast, the inventive latex gloves can be easily doffed or donned without powder, additives or secondary coatings, and are a tremendous advantage in both a practical and economic sense.

In compounding the latex glove formulation, a blend of surfactants, stabilizers, accelerators, cross-linkers, and activators can be added to the liquid terpolymer formulation to optimize the polymerization of the latex and formation of the glove.

Thus, for example, stabilizers such as potassium hydroxide, ammonia, sodium hydroxide and the like can be added on the order of about 0.001 to 0.7 dry parts per 100 dry parts of the latex. Accelerators, such as various zinc dithiocarbamates sold under the trade names Butyl Zimate ™, Ethyl Zimate ™, and Methyl Zimate ™ by R. T. Vanderbilt Company, the sodium salt of dithiocarbamate, and the like can be used on the order of about 0.1 to 1.5 parts per 100 dry parts of the latex.

Crosslinkers such as sulfur and sulfur equivalents such as tetramethylthiuram disulfide sold under the tradename "Methyl Tuads" by R. T. Vanderbilt Co., tetramethylthiuram disulfide sold under the tradename "Ethyl Tuads" by R. T. Vanderbilt Co. and polysulfide thiuram sold under the tradename "Sulfads" by R. T. Vanderbilt Co. can be used on the order of about 0.01 to 2 dry parts per 100 dry parts of latex. Crosslinkers such as zinc oxide, can also be used on the order of about 1 to 7 dry parts per 100 dry parts of the latex. Generally, these additives are employed in solution or as finally divided dispersions in water.

In the examples which follow, and throughout the specification, all parts and percentages are by weight unless otherwise indicated.

EXAMPLE 1

The following polymer formulations were prepared in accordance with the following procedure:

| Component | Weight % | |
|---|---|---|
| | Formula A | Formula B |
| Butadiene | 55 | 55 |
| Acrylonitrile | 34 | 39 |
| Methyl methacrylate | 5 | — |
| Methacrylic acid | 6 | 6 |

Formula A 145 parts per hundred of monomer (phm) of demineralized water were mixed with 0.05 phm ethylene diamine tetraacetic acid (EDTA), 0.25 phm of sodium salt of condensed naphthalenesulfonic acid, 5 phm of 850 angstrom particle size seed latex, 1.0 phm ammonium lauryl sulfate, 0.6 phm t-dodecyl mercaptan and combined with 55% butadiene, 34% acrylonitrile, 5% methyl methacrylate, and 6% methacrylic acid in a stirred reactor. The temperature of the mixture was increased to 100° F. and 0.05 phm potassium persulfate catalyst was injected. During the reaction, 0.5 phm ammonium lauryl sulfate was injected between 60 and 65% conversion of monomer to polymer. The polymerization was "short stopped" with ammonia at 91-93% conversion, and degassed and cooled. "Short stopping" is a term known in the art which means the introduction of a substance into a polymerization reaction that has the effect of stopping the polymerization quite quickly.

Formula B

The same ingredient levels were used in the same reaction procedure, with the exception of the monomer ratio being altered as listed in the table above.

Both formulas were reacted to a conversion of 92% at a maximum polymerization temperature of 135° F., and then short stopped with ammonia. After cooling to ambient temperature, the pH was further adjusted to 7.2-7.5 with ammonia. The residual acrylonitrile was decreased to 0.001% by stripping at 140° F. to 145° F., and the latex was concentrated to 43% total nonvolatiles.

EXAMPLE 2

| Component | Weight % | |
|---|---|---|
| | Formula C | Formula D |
| Butadiene | 65 | 65 |
| Acrylonitrile | 24 | 29 |
| Methyl methacrylate | 5 | — |
| Methacrylic acid | 6 | 6 |

145 phm of demineralized water were contacted with 0.05 phm ethylene diamine tetraacetic acid (EDTA), 0.25 phm of sodium salt of condensed naphthalenesulfonic acid, 5 phm of 850 angstrom particle size seed latex, 1.0 phm ammonium lauryl sulfate, 0.6 phm t-dodecyl mercaptan and combined with 65% butadiene, 24% acrylonitrile, 5% methyl methacrylate, and 6% methacrylic acid in a stirred reactor. The temperature of the mixture was increased to 100° F. and 0.05 phm potassium persulfate catalyst was injected. During the reaction, 0.5 phm ammonium lauryl sulfate was injected between 60 and 65% conversion of monomer to polymer. The polymerization was short stopped with ammonia at 91-93% conversion, and degassed and cooled.

Formula D

The same ingredient levels were used in the same reaction procedure, with the exception of the monomer ratio being altered as listed in the table above.

Both formulas were reacted to a conversion of 92% at a maximum polymerization temperature of 135° F., and then short stopped with ammonia. After short-stopping and cooling to ambient temperature, the pH was further adjusted to 7.2-7.5 with ammonia. The residual acrylonitrile was decreased to 0.001%, and the latex was concentrated to 43% total non-volatiles.

EXAMPLES 3 to 7

Following the procedure of Example 1, except for changes in monomer proportions and the use of different monomers, a number of different latex terpolymers were prepared, as listed in Table 2. Each of the terpolymers in Examples 1 to 7 were then formulated into glove dipping latexes for production by the addition of the additives listed in Table 3.

TABLE 2

| Example | Monomer Composition (phm) | | | | | | | Dryness Coefficient |
|---|---|---|---|---|---|---|---|---|
| | BD | AN | MAA | MMA | MA | BA | EA | |
| 1 A | 55 | 34 | 6 | 5 | — | — | — | 8.5 |
| 1 B | 55 | 39 | 6 | — | — | — | — | 6.5 |
| 2 C | 65 | 24 | 6 | 5 | — | — | — | 8 |
| 2 D | 70 | 29 | 6 | — | — | — | — | 6 |
| 3 | 55 | 34 | 6 | — | 5 | — | — | 10 |
| 4 | 55 | 34 | 6 | — | — | 5 | — | 8 |
| 5 | 55 | 34 | 6 | — | — | — | 5 | 8 |
| 6 | 52.5 | 34 | 6 | 7.5 | — | — | — | 9 |
| 7 | 52.5 | 31.5 | 6 | 10 | — | — | — | 9.5 |

BD—Butadiene
AN—Acrylonitrile
MAA—Methacrylic acid
MMA—Methyl methacrylate
MA—Methyl acrylate
BA—Butyl acrylate
EA—Ethyl acrylate

TABLE 3

| Latex Glove Production Formulation | |
|---|---|
| Ingredient | Dry Parts |
| Latex | 100.00 |
| KOH (10% solution) | 0.50 |
| Butyl Zimate TM (50% dispersion) (R. T. Vanderbilt Co.) (zinc salt of dibutyl dithiocarbamate) | 0.25 |
| Sulfur (50% dispersion) | 0.50 |
| Zinc oxide (50% dispersion) | 5.00 |

EXAMPLE 8

Latex Formulas A & B of Example 1 and Formulas C and D of Example 2 were combined with the additives listed on Table 3, and tested for various physical properties, with the results tabulated in Table 4.

TABLE 4

| TEST | Examples | | | |
|---|---|---|---|---|
| | 1A | 1B | 2C | 2D |
| Modulus (psi) (ASTM D-412-75) | | | | |
| 200% | 1160 | 1248 | 886 | 770 |
| 300% | 1790 | 1952 | 1366 | 1092 |
| 500% | 4725 | — | 4096 | 3820 |
| Tensile Strength (psi) (ASTM D-412-75) | 6450 | 6332 | 6296 | 5750 |
| Elongation (%) (ASTM D-412-75) | 550 | 490 | 580 | 550 |
| Tear Strength (pounds) (ASTM D-524-73) | 320 | 344 | 310 | 275 |
| Permanent Set (%) (ASTM D-412-7513-2) | 12.5 | 10.5 | 12.5 | 8.0 |
| Solvent Swells (ASTM D-471-49) (Diameter Swell %): | | | | |
| Methyl ethyl ketone | 144 | 250 | 164 | 169 |
| Trichloroethylene | 125 | 125 | 223 | 212 |
| Perchloroethylene | 30 | 13 | 41 | 60 |
| Xylene | 81 | 74 | 154 | 144 |
| Hexane | 10 | 6 | 10 | 10 |
| Denatured Alcohol | 13 | 16 | 13 | 13 |
| ASTM Oil #1 @ 158° F. | 3 | 0 | 6 | 6 |
| ASTM Oil #3 @ 158° F. | 13 | 9 | 23 | 23 |
| Strippability | good + (no powder) | powder (talc) | good + (no powder) | powder (talc) |
| Donnability (No Powder) | good (8.5) | not good (6.5) | good (8.0) | not good (6.0) |

What is claimed is:

1. A latex glove with improved doffing and donning characteristics, wherein said glove is formed from a carboxylated open chain aliphatic diene/acrylonitrile/(meth)acrylate latex polymer comprising about 40 to 80 weight % butadiene, about 15 to 45 weight % acrylonitrile, about 2 to 12 weight (meth)acrylate, and about 2 to 10 weight % of a carboxylic acid or a half ester of a dicarboxylic acid.

2. The glove of claim 1, wherein the open chain aliphatic diene is butadiene.

3. The glove of claim 2, wherein the dryness coefficient of the neat glove varies from about 8 to 10.

4. The glove of claim 2 wherein the (meth)acrylate component is a monomer selected from the group consisting of methyl acrylate, methyl methacrylate, butyl acrylate, ethyl acrylate, 2-ethyl hexyl acrylate and mixtures thereof.

5. The glove of claim 1, wherein at least one other latex polymer component selected from the group consisting of acrylics, butyl latex, ethylene-vinyl acetate, carboxylated butadiene styrene, polyurethane, neoprene, and natural rubber is blended with the carboxylated open chain aliphatic diene/acrylonitrile/(meth)acrylate latex polymer, and wherein the other latex components comprise up to about 25% by weight of the total composition.

6. In a method for preparing a latex glove comprising:
   (a) contacting a mold resembling a hand with a coagulant;
   (b) removing the mold from the coagulant;
   (c) contacting the coagulant coated mold with a latex for a sufficient period of time to form a gelled latex coating of a desired thickness on the mold;
   (d) drying the latex coated old;
   (e) curing the dried latex coated mold;
   (f) removing the finished cured glove from the mold; the improvement which comprises using a latex comprising a carboxylated open chain aliphatic diene/acrylonitrile/(meth)acrylate polymer comprising about 40 to 80 weight % butadiene, about 15 to 45 weight % acrylonitrile, about 2 to 12 weight % (meth)acrylate, and about 2 to 10 weight % of a carboxylic acid.

7. The method of claim 6, wherein the open chain aliphatic diene is butadiene.

8. The method of claim 7, wherein the dryness coefficient of the neat glove varies from about 8 to 10.

9. The method of claim 7, wherein the (meth)acrylate component is a monomer selected from the group consisting of methyl acrylate, methyl methacrylate, butyl acrylate, ethyl acrylate, 2-ethyl hexyl acrylate and mixtures thereof.

10. The method of claim 6, wherein at least one other latex polymer component selected from the group consisting of acrylics, butyl latex, ethylene-vinyl acetate, carboxylated butadiene styrene, polyurethane, neoprene, and natural rubber is blended with the carboxylated open chain aliphatic diene/acrylonitrile/(meth)acrylate latex polymer, and wherein the other latex components comprise up to about 25% by weight of the total composition.

11. A method for imparting improved donning and doffing characteristics to a latex glove, comprising forming the glove from a latex composition comprising a carboxylated open chain aliphatic diene/acrylonitrile/(meth)acrylate polymer comprising about 40 to 80 weight % butadiene, about 15 to 45 weight % acrylonitrile, about 2 to 12 weight % (meth)acrylate, and about 2 to 10 weight % of a carboxylic acid or a half ester of a dicarboxylic acid.

12. The method of claim 11, wherein the open chain aliphatic diene is butadiene.

13. The method of claim 11, wherein the (meth)acrylate component is a monomer selected from the group consisting of methyl acrylate, methyl methacrylate, butyl acrylate, ethyl acrylate, 2-ethyl hexyl acrylate and mixtures thereof.

14. The method of claim 11, wherein the dryness coefficient of the neat glove varies from about 8 to 10.

15. The method of claim 11, wherein at least one other latex polymer component selected from the group consisting of acrylics, butyl latex, ethylene-vinyl acetate, carboxylated butadiene styrene, polyurethane, neoprene, and natural rubber is blended with the carboxylated open chain aliphatic diene/acrylonitrile/(meth)acrylate latex polymer, wherein the other latex components comprise up to about 25% by weight of the total composition.

* * * * *

UNITED STATES PATENT AND TRADEMARK OFFICE
CERTIFICATE OF CORRECTION

PATENT NO. : 5,084,514
DATED : January 28, 1992
INVENTOR(S) : Szczechura et al

It is certified that error appears in the above-identified patent and that said Letters Patent is hereby corrected as shown below:

At column 1, line 6, after "Invention" insert
-- This invention relates to latex gloves with improved --.

At column 2, line 15, after "discloses" insert -- vinyl --.

At column 2, line 16, after "acrylate" insert
-- copolymers or vinylidene chloride/alkyl acrylate --.

At column 6, between lines 54 and 55, insert
-- Formula C --.

At column 8, line 32, after "weight" insert -- % --.

At column 8, line 61, change "old" to -- mold --.

Signed and Sealed this

Twenty-fifth Day of May, 1993

Attest:

MICHAEL K. KIRK

*Attesting Officer*  *Acting Commissioner of Patents and Trademarks*